United States Patent
Mochida et al.

(10) Patent No.: US 8,421,909 B2
(45) Date of Patent: Apr. 16, 2013

(54) EXPOSURE CONTROL APPARATUS AND EXPOSURE CONTROL PROGRAM FOR VEHICLE-MOUNTED ELECTRONIC CAMERA

(75) Inventors: Kentaro Mochida, Chiryu (JP); Takayuki Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 316 days.

(21) Appl. No.: 12/318,146

(22) Filed: Dec. 22, 2008

(65) Prior Publication Data

US 2009/0174809 A1   Jul. 9, 2009

(30) Foreign Application Priority Data

Dec. 26, 2007   (JP) ................. 2007-334935

(51) Int. Cl.
*H04N 5/235* (2006.01)
*H04N 7/18* (2006.01)

(52) U.S. Cl.
USPC .......................... 348/362; 348/148

(58) Field of Classification Search ............. 348/148, 348/149, 362–368
See application file for complete search history.

(56) References Cited

U.S. PATENT DOCUMENTS

| | | | |
|---|---|---|---|
| 5,255,044 A | 10/1993 | Ishiguro | |
| 5,565,918 A | 10/1996 | Homma et al. | |
| 5,703,644 A * | 12/1997 | Mori et al. | 348/363 |
| 6,185,374 B1 | 2/2001 | Yamaguchi et al. | |
| 7,251,056 B2 | 7/2007 | Matsushima | |
| 7,365,779 B2 | 4/2008 | Yamada | |
| 2001/0010540 A1 * | 8/2001 | Ogura et al. | 348/136 |
| 2005/0083428 A1 | 4/2005 | Ohkawara | |
| 2008/0024606 A1 * | 1/2008 | Kawasaki | 348/148 |
| 2008/0094471 A1 * | 4/2008 | Usami et al. | 348/148 |
| 2009/0097745 A1 | 4/2009 | Kim et al. | |

FOREIGN PATENT DOCUMENTS

| | | |
|---|---|---|
| JP | H06-253208 | 9/1994 |
| JP | H06-253298 | 9/1994 |
| JP | A-H11-337998 | 12/1999 |
| JP | A-2000-075345 | 3/2000 |
| JP | 2005-148308 | 6/2005 |

OTHER PUBLICATIONS

Office Action dated Sep. 15, 2009 in the corresponding Japanese patent application No. 2007-334935 (and English translation).
Office Action dated on Jun. 10, 2011 from the U.S. Patent Office in related U.S. Appl. No. 12/318,145.
Notice of Allowance mailed on Dec. 9, 2011 from the U.S. Patent Office in related application serial No. 12/318,144.
Notice of Allowance mailed on Oct. 3, 2012 from the U.S. Patent Office in related U.S. Appl. No. 12/318,145.
Office Action dated on Sep. 21, 2011 from the U.S. Patent Office in related U.S. Appl. No. 12/318,144.
Final Office Action dated on Nov. 25, 2011 from the U.S. Patent Office in related U.S. Appl. No. 12/318,145.

* cited by examiner

*Primary Examiner* — Chieh M Fan
*Assistant Examiner* — Akshay Trehan
(74) *Attorney, Agent, or Firm* — Posz Law Group, PLC

(57) ABSTRACT

In an exposure control apparatus for exposure control of a vehicle-mounted camera which captures successive images of a scene ahead of the vehicle, two different regions (sets of picture elements) in each image are selected for use in measuring the brightness of an object such as a preceding vehicle and the brightness of the road surface, respectively. The camera exposure is controlled based upon both of these brightness measurement results.

3 Claims, 13 Drawing Sheets

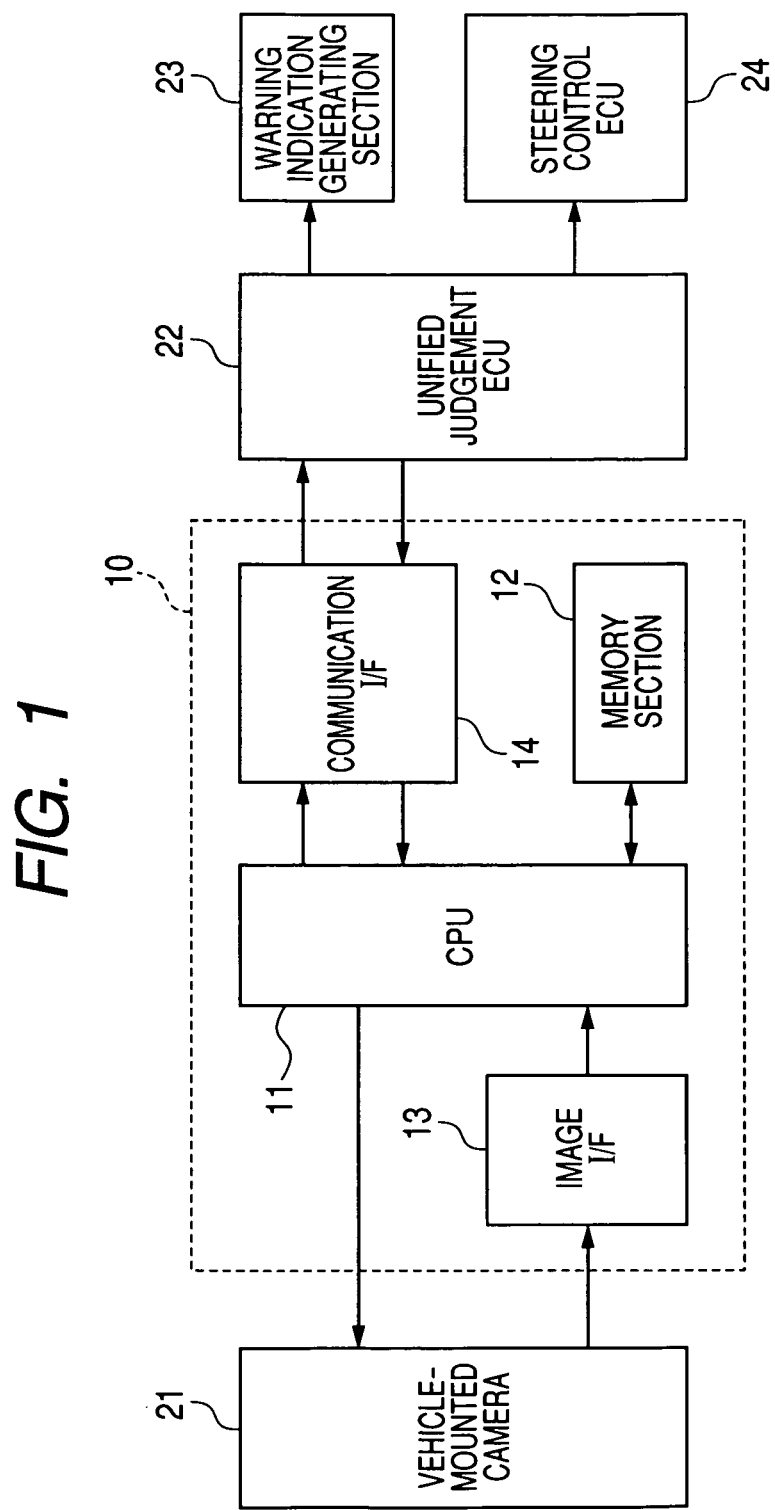

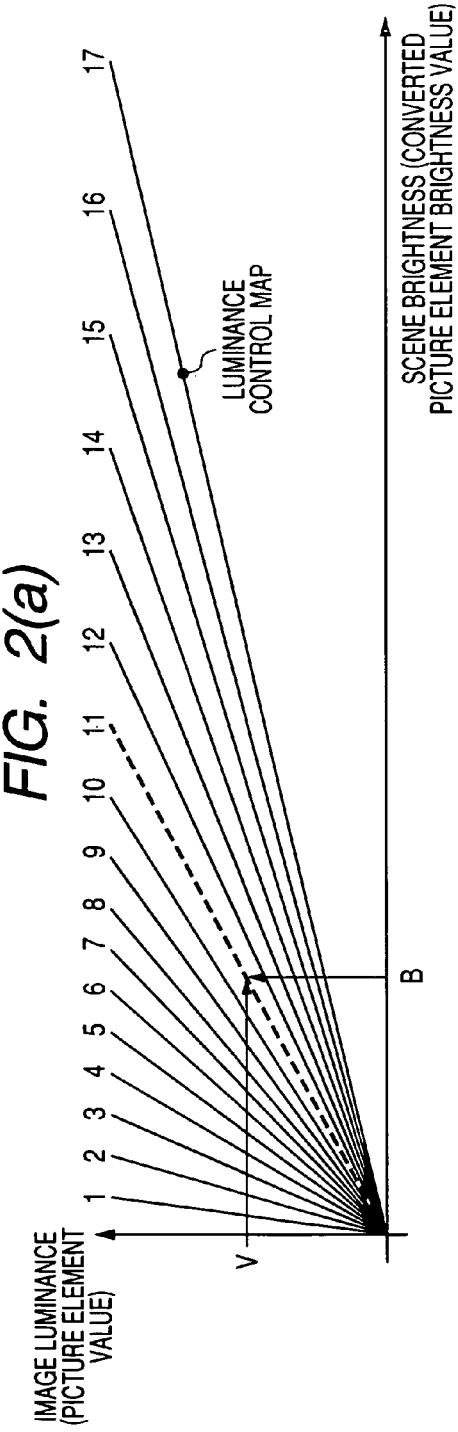

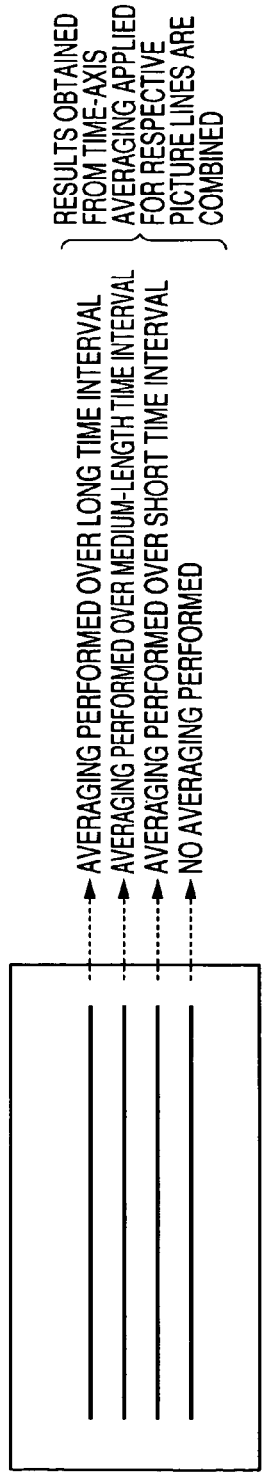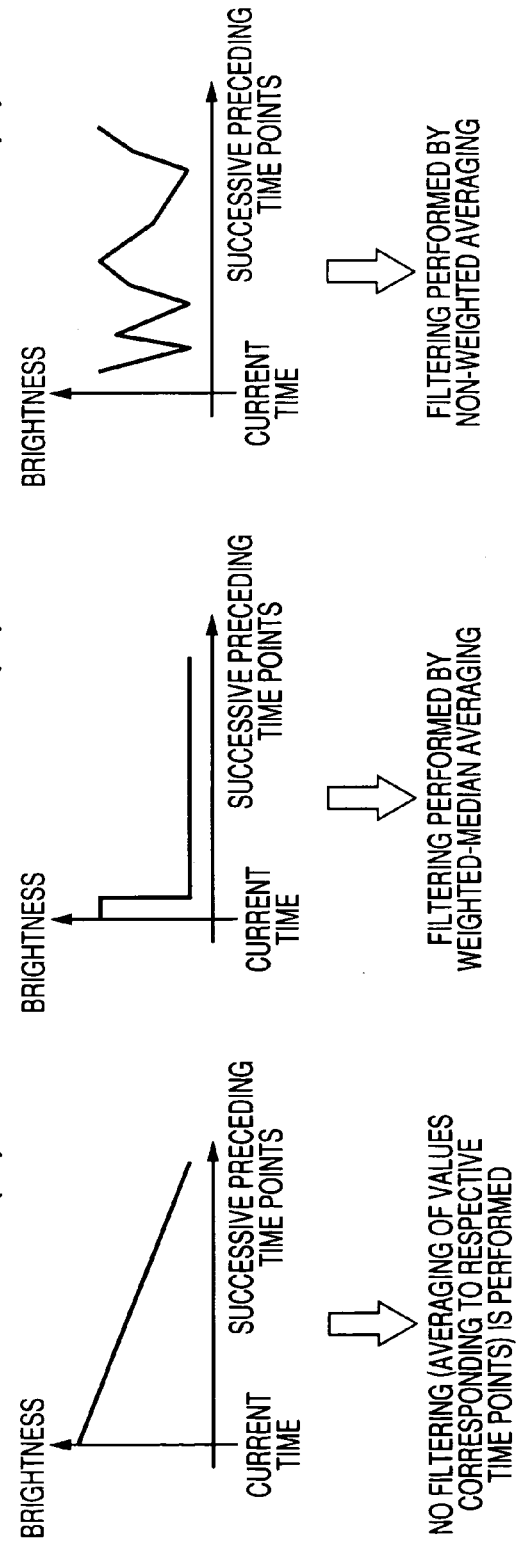

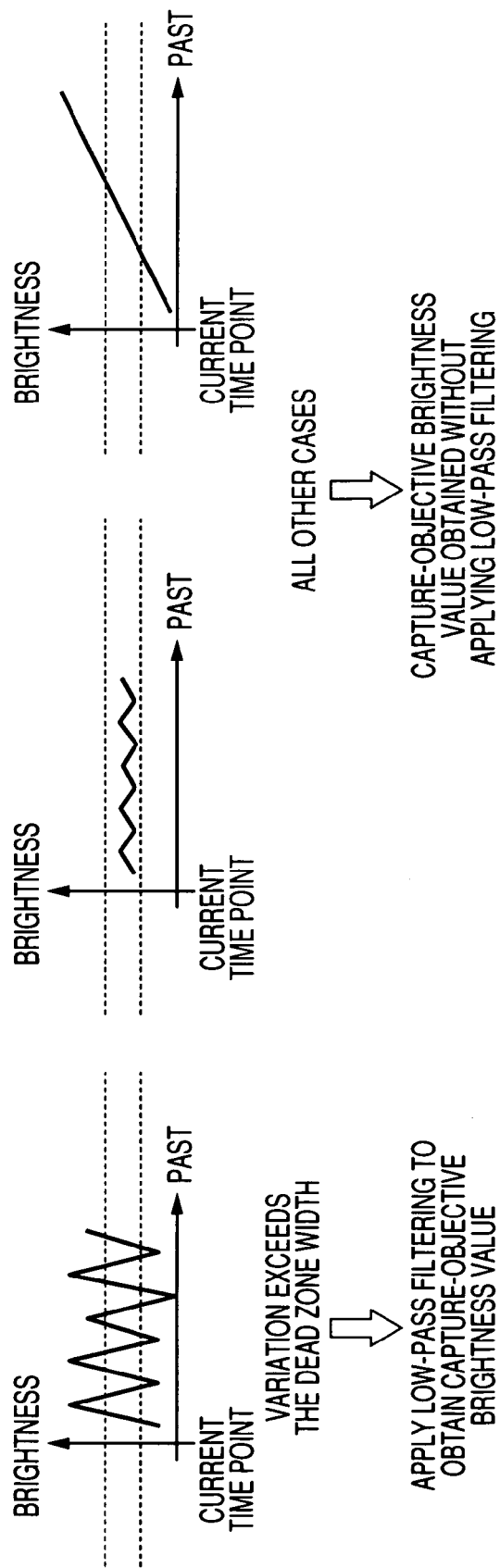

EXPOSURE CONTROL APPARATUS AND EXPOSURE CONTROL PROGRAM FOR VEHICLE-MOUNTED ELECTRONIC CAMERA

CROSS-REFERENCE TO RELATED APPLICATIONS

This application is based on and incorporates herein by reference Japanese Patent Application No. 2007-334935 filed on Dec. 26, 2007. This application is also related to U.S. applications Ser. No. 12/318,145, entitled EXPOSURE CONTROL APPARATUS AND EXPOSURE CONTROL PROGRAM FOR VEHICLE-MOUNTED ELECTRONIC CAMERA, and Ser. No. 12/318,144 entitled EXPOSURE CONTROL APPARATUS AND EXPOSURE CONTROL PROGRAM FOR VEHICLE-MOUNTED ELECTRONIC CAMERA, both simultaneously filed on Dec. 22, 2008 with the present application.

BACKGROUND OF THE INVENTION

1. Field of Application

The present invention relates to an exposure control apparatus, for exposure control of an electronic camera which captures successive images expressing an object such as a preceding vehicle, which is located ahead of a vehicle in which the camera is installed.

2. Description of Related Art

In recent years, vehicle-installed electronic cameras (in general, digital video cameras, referred to in the following simply as cameras) have come into use for capturing images of a region located ahead of the vehicle, with technology having been developed whereby the captured images (that is sets of digital data expressing respective captured images) are processed for detection of objects such as a preceding vehicle. The processing results can be used to generate warning indications to a vehicle driver, control driving of the vehicle, etc. A vehicle having such a camera and processing apparatus installed therein, which are being described, is referred to in the following as the "local vehicle".

With such technology, it is important that the exposure of the camera be appropriately controlled in accordance with variations in the brightness of the scene captured by the camera, in order to maximize the reliability of recognizing an object such as a preceding vehicle which may appear in an image obtained from the camera.

As described for example in Japanese patent first publication No. 6-253208 (designated as reference document 1 herein), a method of using camera images for recognition of white lines on the road surface has been proposed whereby two laterally extending sections are selected within each image. A first one of these sections is positioned to contain a part of the (imaged) road surface that is currently close to the local vehicle. The data obtained from the first section, in each of successive captured images, are utilized for recognition of white lines on the road surface. The second section is positioned to contain a part of the road surface that is farther ahead of the local vehicle (i.e., is in an upper part of each captured image). Hence the second section contains a region which will be subjected to recognition processing at a future time point, determined by the speed at which the local vehicle is travelling. Designating the average brightness levels of the first and second sections as b0 and b1 respectively, the difference between these is obtained for each of successive captured images. If the difference is found to exceed a predetermined threshold value, then the cameran exposure which will be applied in capturing the next image is adjusted based on the brightness value b1 (i.e., by changing the camera shutter speed, etc).

With the above method of reference document 1, if for example the road surface ahead of the vehicle changes between a brightly sunlit condition and a shade condition, the cameran exposure can be appropriately controlled for each of successive captured images, i.e., such as to prevent the abrupt change in scene brightness from affecting the reliability of white line detection.

However in an actual road environment, the brightness of the road surface will not generally change between a sunlit condition and a shade condition with the change extending uniformly across the road surface in a simple manner. Instead, the changes can take various forms. For that reason, it is difficult to reliably control the cameran exposure by such a method under actual operating conditions.

It has also been proposed, for example in Japanese patent first publication No. 2005-148308 (designated as reference document 2 herein) to use an exposure control apparatus whereby the brightness of the road surface ahead of a local vehicle is measured for use in cameran exposure control, while excluding the effects of white lines (traffic lane markers) formed on the road surface. A video camera on the vehicle obtains successive captured images of a region directly ahead of the vehicle, which contains these white lines. A plurality of areas within each captured image are selectively examined to measure their respective brightness levels, with these areas being predetermined as corresponding to areas of the road surface that are normally outside the white lines when the vehicle is travelling along the center of a traffic lane. The respective brightness values of these areas are measured, and the exposure of the vehicle-mounted camera is controlled based on the results.

On the case of capturing images for use in recognition of a target object (i.e., a 3-dimensional object) such as a preceding vehicle, it would be possible to perform exposure control of the camera based on measuring the brightness of the road surface as described above, since normally that brightness is relatively stable. However the brightness values of various vehicles may differ substantially, so that in the prior art, such exposure control has been performed based upon measuring the brightness of the preceding vehicle which is to be detected. However while such exposure control is being performed, sudden changes in the level of measured brightness may occur, since the preceding vehicle can arbitrarily enter or leave the field of view of the camera, or another vehicle (e.g., having a different level of brightness) may suddenly enter the field of view of the camera, by cutting-in ahead of the local vehicle.

In the prior art, it has not been possible to control the cameran exposure to respond sufficiently quickly to such abrupt changes in the level of brightness that is being measured, so that stable and accurate control of the cameran exposure has been difficult to achieve.

SUMMARY OF THE INVENTION

It is an objective of the present invention to overcome the above problem by providing an exposure control apparatus for a vehicle-mounted camera, which is capable of stable measurement of the brightness of a target object and hence provides improved control of the cameran exposure, for a purpose of obtaining images to be used in processing for recognition of the target object.

The invention provides an exposure control apparatus for controlling the exposure of an electronic digital camera installed on a vehicle (e.g., by controlling the shutter speed, etc., of the camera), with the camera being disposed to capture an external scene as an image formed of an array of picture elements having respective luminance values. The apparatus is configured (e.g., by being provided with exposure relationship data stored beforehand in a non-volatile memory) to convert the luminance values of an image to corresponding brightness values of the external scene that is being captured by the camera, with the conversion being executed based on the current exposure condition (shutter speed, etc.,) of the camera.

The apparatus is characterized in comprising extraction circuitry for extracting (from each image captured by the camera) a set of picture elements which constitute a target object-use region of the image, for use in measuring the brightness of a target object (in general, a preceding vehicle) located ahead of the local vehicle, and a second set of picture elements which constitute a road surface-use region of the image, for use in measuring the brightness value of the road surface. The camera exposure is controlled based upon brightness values obtained for the road surface-use region and for the target object-use region, in combination.

By comparison with prior art methods of exposure control of a such a vehicle-mounted camera, whereby only the brightness of the target object is measured and used in controlling the cameran exposure, the present invention enables more stable exposure control to be achieved.

Furthermore in certain circumstances, such as when the external scene varies between sunlight and shade conditions, or the local vehicle enters or exits from a tunnel, sudden large changes in the brightness of the road surface can also occur. However with the present invention, due to the fact that exposure control is based upon measuring both the brightness of a target object (if present) and also the brightness of the road surface, greater stability of exposure control can be achieved under various conditions.

Furthermore with the present invention, such improved stability is achieved without requiring an excessive size of a brightness measurement region within each image (i.e., a region whose picture elements are used for deriving a measured brightness value to be applied in controlling the cameran exposure). As a result, the improved stability of exposure control can be achieved without causing a significant increase in the processing load by comparison with other types of exposure control apparatus.

The target object-use region and the road surface-use region are preferably located at respective fixedly predetermined positions within each image. This reduces the possibility of erroneous recognition of objects and greater stability of exposure control, and so provides improved performance by comparison with a prior art type of exposure control apparatus in which the target object-use region is varied in accordance with the recognition processing that is being performed.

The target object-use region is preferably formed with a shape which successively increases in horizontal width, along a direction towards an upper part of the road surface-use region.

In addition, the target object-use region is preferably formed such that the uppermost part of that region is located at the FOE (focus of expansion) position in the image. This serves to prevent detection of the brightness of the sky, buildings, etc., so that more stable exposure control can be achieved, i.e., fluctuations in the detected brightness due to such objects can be prevented.

An exposure control apparatus according to the present invention can be advantageously implemented by processing performed in accordance with a program executed by a computer.

BRIEF DESCRIPTION OF THE DRAWINGS

FIG. 1 is a general block diagram of a vehicle system incorporating an embodiment of an exposure control apparatus;

FIG. 2 shows examples of exposure control maps for use with the embodiment;

FIG. 12 illustrates a manner in which the strength of time-axis filtering applied to successively obtained average brightness values of respective lines of picture elements in the brightness measurement region is determined;

FIG. 13 shows diagrams illustrating an operation of judging whether or not time-axis filter is applied to respective lines of picture elements in the brightness measurement region;

FIG. 14 shows diagrams illustrating an operation of judging whether or not a capture-objective brightness value for use in exposure control is obtained by low-pass filter processing of successively obtained values;

DESCRIPTION OF PREFERRED EMBODIMENTS

Figure 3:
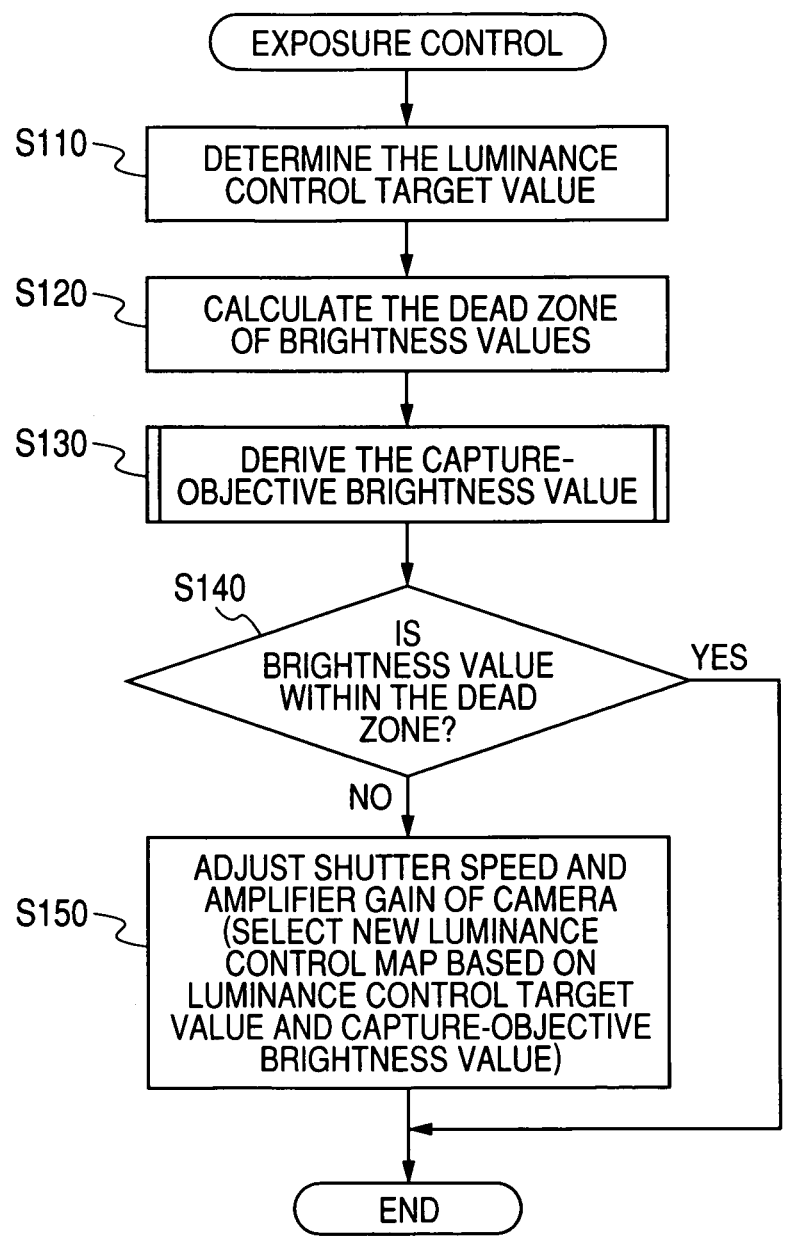
FIG. 3 is a flow diagram of exposure control processing executed by the embodiment.

An embodiment of an exposure control apparatus for a vehicle-mounted camera will be described in the following referring to the drawings.

1. Overall Configuration

FIG. 1 is a block diagram showing the general configuration of an exposure control apparatus 10 and its relationship to other components of a vehicle system. The exposure control apparatus 10 is installed in a vehicle (the "local vehicle") and is connected to a vehicle-mounted digital video camera (referred to in the following simply as the camera) 21 and to a unified judgement section 22, with the unified judgement section 22 being connected to a warning indication generating section 23 and a steering control ECU 24 as shown. Data obtained by the exposure control apparatus 10 based on the contents of captured images of a scene ahead of the local vehicle are used in warning indication processing and steering control processing that are executed by the unified judgement section 22. Specifically, recognition processing is applied to the image data, to detect a preceding vehicle as a target object which may be located ahead of the local vehicle, and the results of the recognition processing are used for warning indication and steering control purposes.

The exposure control apparatus 10 consists of a CPU 11, a memory section 12, an image interface 13 which transfers data of successive captured images from the camera 21 to the CPU 11, and a communication interface 14 for executing communication with the unified judgement section 22. The memory section 12 includes a non-volatile memory such as a ROM (read-only memory, not shown in the drawings) having programs and data including a plurality of luminance control maps (described hereinafter) stored therein beforehand, and a RAM (random-access memory, not shown in the drawings) and data registers, for storing and processing data of a plurality of images which have been successively captured up to the current point in time.

The camera 21 is installed within the passenger compartment of the local vehicle at a fixed position (for example, beside the rear view mirror), and captures successive images (i.e., as respective video signal frames) of a region of the road ahead of the vehicle. When installed in the vehicle, the orientation of the camera 21 is adjusted such as to set a specific image capture range with respect to the direction of advancement of the vehicle.

The camera 21 incorporates a usual type of CCD or CMOS image sensor, together with a video amplifier, A/D (analog-to-digital) converter, etc. When an image is captured by the image sensor, as an analog signal expressing successive luminance values, the video amplifier applies a specific amount of gain to the analog signal, which is then converted to successive digital values (luminance values of picture elements) by the A/D converter, and stored as data in the memory section 12. The CPU 11 then reads out and processes the image data, operating separately on respective picture lines of the image, where each picture line is a horizontal row of picture elements (horizontal scan line) of the image.

The image interface 13 transfers the picture element values, together with horizontal and vertical synchronizing signals of the image, from the camera 21 to the CPU 11. The CPU 11 determines respective image positions corresponding to each of the picture elements, based upon the horizontal and vertical synchronizing signals. The picture element values are then stored in the memory section 12 in correspondence with position information specifying the respective locations of the picture elements within the image.

The CPU 11 processes the image data to perform recognition of a target object such as a preceding vehicle which may appear in the captured images. Based on the recognition processing results, the CPU 11 supplies position information concerning any target object to the unified judgement section 22 via the exposure control apparatus 10.

In addition, the CPU 11 controls the camera 21 such as to appropriately capture images of the scene ahead of the vehicle. Specifically, the CPU 11 adjusts the frame rate and the exposure parameters of the camera 21, by generating corresponding adjustment commands and supplying these to the camera 21 as camera control command values. In the following it is assumed that the exposure parameters of the camera 21 are the shutter speed and video amplifier gain.

The communication interface 14 enables communication between the CPU 11 and the unified judgement section 22, for transferring to the unified judgement section 22 the above-described information concerning results of target object recognition. Based on this information, the unified judgement section 22 judges whether there is a danger of collision between the local vehicle and a target object. When it is judged that such a danger exists, the unified judgement section 22 controls the warning indication generating section 23 to generate a warning indication to the vehicle driver. If the danger is judged to be above a predetermined level, then in addition to generating a warning indication, the unified judgement section 22 also instructs the steering control ECU 24 to perform appropriate steering control of the vehicle. Specifically, this may be control whereby the amount of steering assistance that is applied to the steering mechanism is adjusted appropriately, or whereby the steering mechanism is controlled to be automatically driven such as to avoid the danger of collision.

2. Outline of Exposure Control

The cameran exposure control operation of this embodiment will be summarized in the following. The exposure control apparatus 10 data has stored therein beforehand expressing a plurality of characteristics referred to in the following as luminance control maps. Each of these corresponds to a specific exposure condition of the camera 21 (specific combination of shutter speed and video amplifier gain), and expresses the relationship between the brightness of an external scene ahead of the vehicle which is captured as an image by the camera 21, and resultant luminance values of picture elements of the image. The picture element luminance values are supplied from the camera 21 as respective digital values.

FIG. 2 shows an example of such a plurality of luminance control maps, with values of external scene brightness plotted along the horizontal axis and image luminance (picture element luminance values, as obtained from the camera) along the vertical axis.

In the example of diagram (a) of FIG. 2, if the image luminance (e.g., average of a plurality of picture element values) is a value V (referred to herein as a luminance control target value, which is predetermined as being an appropriate value of image luminance), when a capture-objective brightness value (measured as described hereinafter) is B and the luminance control map 11 is being used, then this is a condition in which the cameran exposure parameters (shutter speed, video amplifier gain), determined by the luminance control map 11, are correctly set.

Referring to diagram (b) of FIG. 2 however in which the luminance control map No. 7 is being used, with the capture-objective brightness value B being as shown, the image luminance value deviates from the target value V, i.e., takes the value K, so that the cameran exposure is not correctly set. In that case the apparatus performs exposure control by selecting the luminance control map No. 13, so that the image luminance will be restored to the target value V. Exposure control is thereby applied such as to maintain the image luminance close to an appropriate value, irrespective of variations in brightness of the scene that is captured by the camera.

The luminance control target value is determined in accordance with the luminance control map which is currently selected, i.e., there is a predetermined relationship between the luminance control map numbers and the luminance control target values, as described hereinafter.

With this embodiment, instead of measuring the scene brightness based on all of the picture elements of a captured image from the camera 21 it is derived based on a fixedly predetermined part of each image, having a specific shape, location and size, referred to as the brightness measurement region.

The exposure control apparatus 10 of this embodiment basically performs exposure control in accordance with the following sequence of operations (1) to (4).

(1) Determination of Luminance Control Target Value

The luminance control target value is determined in accordance with the currently selected luminance control map, based on the aforementioned predetermined relationship, and varies between a day value and a night value. To ensure that the control conditions do not change abruptly, the luminance control target value varies only gradually during each transition between the day value and night value.

(2) Calculation of Dead Zone

A dead zone (illustrated in FIG. 5) of brightness values is determined, as described hereinafter.

(3) Derivation of Capture-Objective Brightness Value

Figure 7:
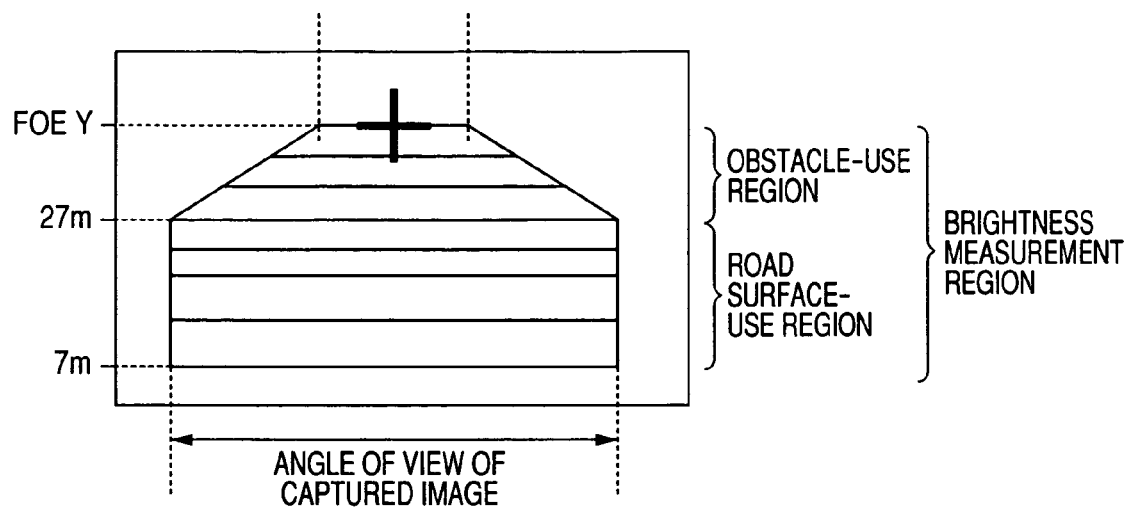
FIG. 7 illustrates the form of a brightness measurement region of an image.

Two adjoining regions within each captured image constitute the aforementioned brightness measurement region with this embodiment, i.e., a road surface-use region for measuring the brightness of the road surface, and a target object-use region for measuring the brightness of a preceding vehicle (when present), as shown in FIG. 7. With this embodiment, respectively different forms of weighted-averaging processing are applied to these two regions, and a capture-objective brightness value is obtained based on average brightness values that are respectively calculated for the two regions.

(4) Control of Amplifier Gain and Shutter Speed

If the capture-objective brightness value obtained by operation (3) is found to be outside the dead zone, an appropriate other one of the luminance control maps is selected to be used, based upon the luminance control target value determined in operation (1) and upon the capture-objective brightness value obtained in operation (3), as described above referring to diagram (b) of FIG. 2. The exposure condition (shutter speed and amplifier gain) of the camera 21 is then adjusted in accordance with the newly selected luminance control map.

3. Processing Executed by CPU

The CPU 11 periodically (e.g., once in every 100 ms) executes a processing routine in accordance with a stored program, as exposure control processing. In this processing, a capture-objective brightness value is derived based on data of one or more images that have been successively acquired up to the current point in time from the camera 21 and stored in the memory section 12. Based on this capture-objective brightness value, the luminance control map is changed if necessary, and the cameran exposure parameters (shutter speed, amplifier gain) adjusted accordingly. This processing will be described referring to the flow diagram of FIG. 3.

When processing begins, the CPU 11 first (step S110) determines a luminance control target value. Specifically, a correspondence relationship (shown as the full-line characteristic in the diagram (c) of FIG. 4) is stored beforehand, relating luminance control map numbers (e.g., the map numbers 1 to 17 shown in FIG. 2), plotted along the horizontal axis, to luminance control target values which are along the vertical axis. Based on that correspondence relationship, a luminance control target value is derived in accordance with the number of the luminance control map which is currently being used.

At the first execution of the processing routine of FIG. 3 (when operation of the system is started), a predetermined one of the luminance control maps is selected to be utilized, and the corresponding luminance control target value is obtained.

Figure 4A:
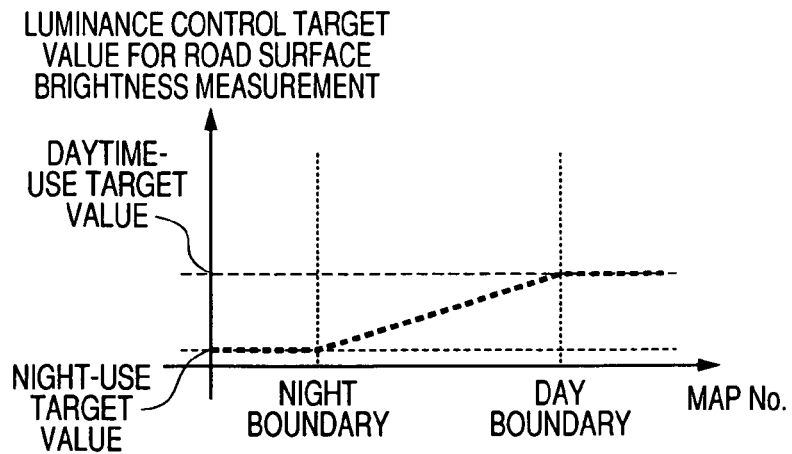
FIG. 4 shows diagrams for use in describing a way of setting luminance control target values which are used with the embodiment.
Figure 4B:
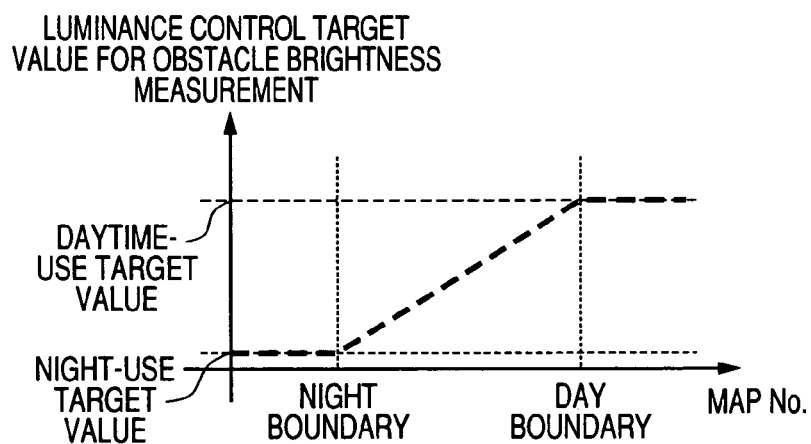
Figure 4C:
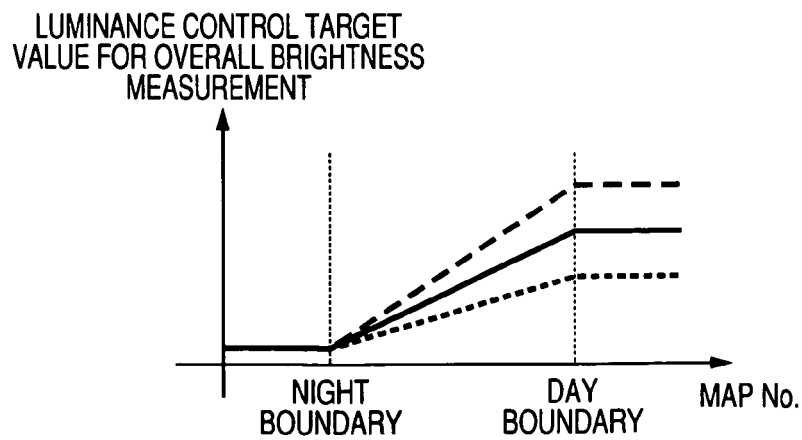

The correspondence relationship of FIG. 4(c) is derived by averaging the correspondence relationships of FIGS. 4(a) and 4(b), which are respectively shown as a dotted-line characteristic and as a broken-line characteristic in FIG. 4(c). FIG. 4(a) is a relationship between luminance control map numbers (plotted along the horizontal axis) to road surface luminance control target values (along the vertical axis) which is appropriate for the aforementioned road surface-use region of the brightness measurement region (i.e., an image region containing a part of the road surface that is close to and directly ahead of the local vehicle). FIG. 4(b) is a corresponding relationship which is appropriate for the target object-use region of the brightness measurement region (an image region which is some distance ahead of the local vehicle and may contain a target object such as a preceding vehicle).

Hence with this embodiment, each luminance control target value is not simply determined as being appropriate for an image region in which a target object is to be recognized, but instead is derived as a combination of target values that are appropriate for a target object and for the road surface, respectively.

When the average scene brightness is low (in general, at night), luminance control maps having low numbers will be selected for use, whereas when the average scene brightness is high (during daytime), maps having high numbers will be utilized. With this embodiment as illustrated in FIG. 4, the relationship between the luminance control target values and map value numbers is predetermined such that a low luminance control target value is selected during night operation and a higher luminance control target value is selected during daytime operation. This is done to ensure that the apparatus will function correctly even when large-scale increases in image luminance occur during night-time operation (e.g., due to light received from sources such as headlamps of oncoming vehicles, etc.).

Also as shown, there is a gradual transition between the night-use luminance control target value and the daytime-use luminance control target value, to prevent abrupt changes in image luminance. Since the luminance control target value is selected in accordance with the luminance control map which is currently in use, the gradual transition is achieved by appropriately relating the luminance control target values to the luminance control map numbers.

Figure 5:
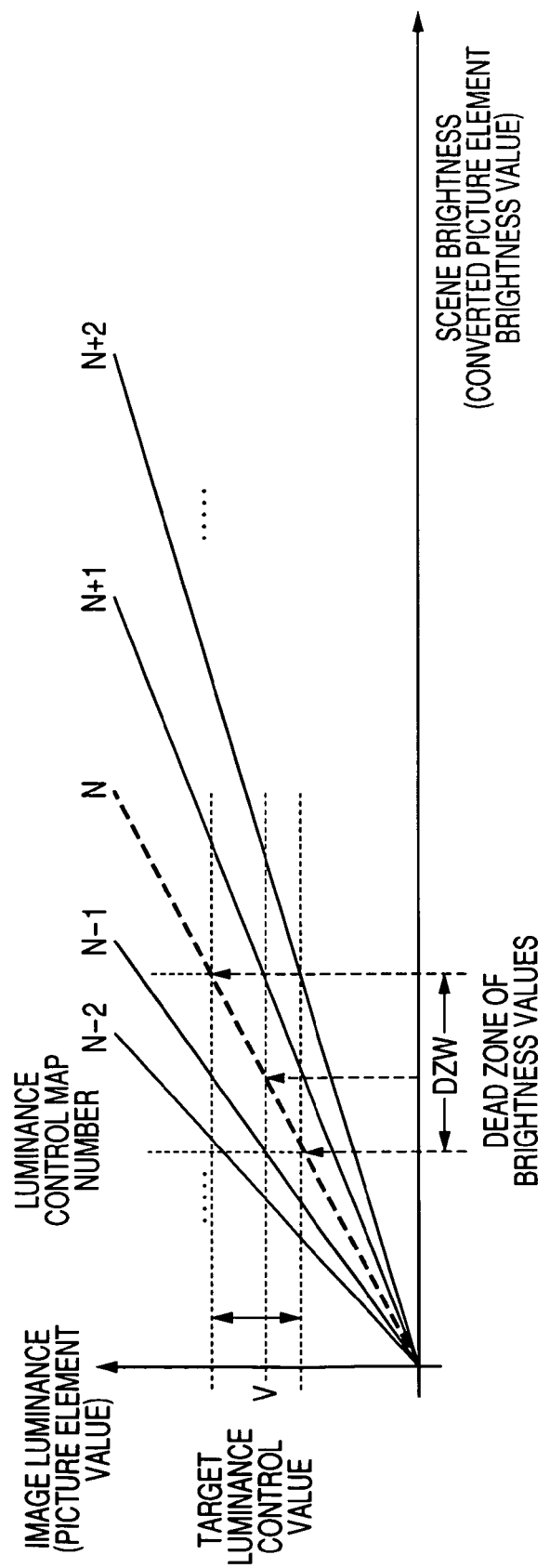
FIG. 5 is a diagram for describing a dead zone of brightness values.

Next in step S120, the dead zone is calculated. This is a range of brightness values for use in judging whether it is necessary to adjust the cameran exposure (select another luminance control map). The dead zone is used to prevent unnecessary frequent changes in the exposure condition. Specifically as shown in FIG. 5, designating the luminance control map that is currently being used as map N, and designating the corresponding luminance control target value (obtained in step S110) as V, the dead zone is defined as a scene brightness range extending between the intersections of the luminance control target value V with the two adjacent luminance control maps (N−1) and (N+1) (i.e., maps whose numbers immediately precede and immediately succeed that of the currently selected luminance control map).

Next in step S130, processing is performed to obtain the capture-objective brightness value. This is based on converting the picture element luminance values of the brightness measurement region (i.e., specific fixed region within the image) to corresponding converted brightness values by using the luminance control map which is currently selected, and will be described referring to the flow diagram of FIG. 6.

Firstly in step S131, the picture element values of the brightness measurement region are acquired, in units of picture lines. As shown in FIG. 7, the brightness measurement region of this embodiment is formed of a trapezoidal region referred to as the target object-use region, for measuring the brightness of a preceding vehicle (i.e., a region located some distance ahead of the local vehicle, at a position where a preceding vehicle may appear in the image) and a rectangular region referred to as the road surface-use region, corresponding to a part of the road which is located close to and immediately in front of the local vehicle, and which serves for measuring the brightness of the road surface. The image luminance value is measured as a combination of values that are derived from the target object-use region and the road surface-use region.

Specifically, the road surface-use region has a vertical dimension (height dimension) corresponding to an area that extends approximately 7 to 27 meters ahead from the front of the local vehicle, and a width dimension (lateral dimension) determined such as to contain the two white lines which are located respectively at the right and left sides of a traffic lane in which the local vehicle is running.

The uppermost part of the target object-use region is set at the FOE (focus of expansion) position for the camera 21. The width of that uppermost part is made equal to the typical azimuth extent (±10°) of a region scanned by a millimeter-wave radar apparatus which may be installed in the local vehicle, for scanning the scene ahead of the vehicle with radar waves and judging the position, shape, speed, etc., of preceding objects based on resultant reflected radar waves.

The trapezoidal shape of the target object-use region successively widens towards the upper part of the road surface-use region, i.e., it is formed of picture lines that are of successively increasing length, whereas the road surface-use region is formed of full-width picture lines (corresponding to the full horizontal angle of view of the camera 21). This shape of the target object-use region is used to ensure that the cameran exposure can be rapidly adjusted when another vehicle cuts in ahead of the local vehicle, i.e., to provide a seamless transition between detecting the brightness of the road surface and detecting the brightness of a preceding vehicle.

Since the external region (in the scene ahead of the local vehicle) that is beyond the FOE will generally contain features such as sky, buildings, etc., which are not relevant as target objects, it is ensured that these are excluded from the captured images, and so will not have an adverse effect upon exposure control.

To reduce the data processing load, thinning-out of picture lines is performed (i.e., with one out of each of successive pluralities of picture lines of the image being omitted) when extracting (from the most recently captured image) picture elements constituting the luminance measurement region. In the road surface-use region, thinning-out of picture lines is performed at spacings which are approximately identical to one another with respect to distance from the local vehicle. That is to say, the higher the positions of the lines within the luminance measurement region, the smaller is made the proportion of lines omitted by the thinning-out processing. In the target object-use region, the thinning-out is performed at regular spacings, i.e., the spacing between lines that are omitted by the thinning-out processing is held constant.

Figure 8:
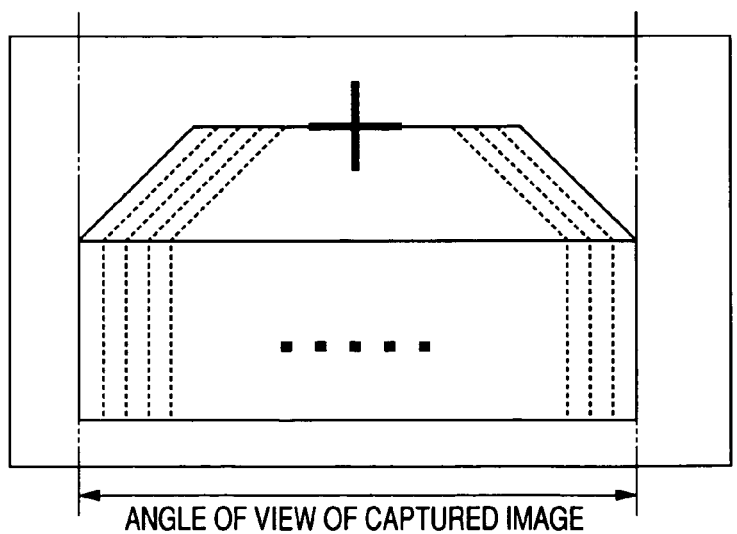
FIG. 8 illustrates thinning-out of picture elements from respective lines of the brightness measurement region.
Figure 9:
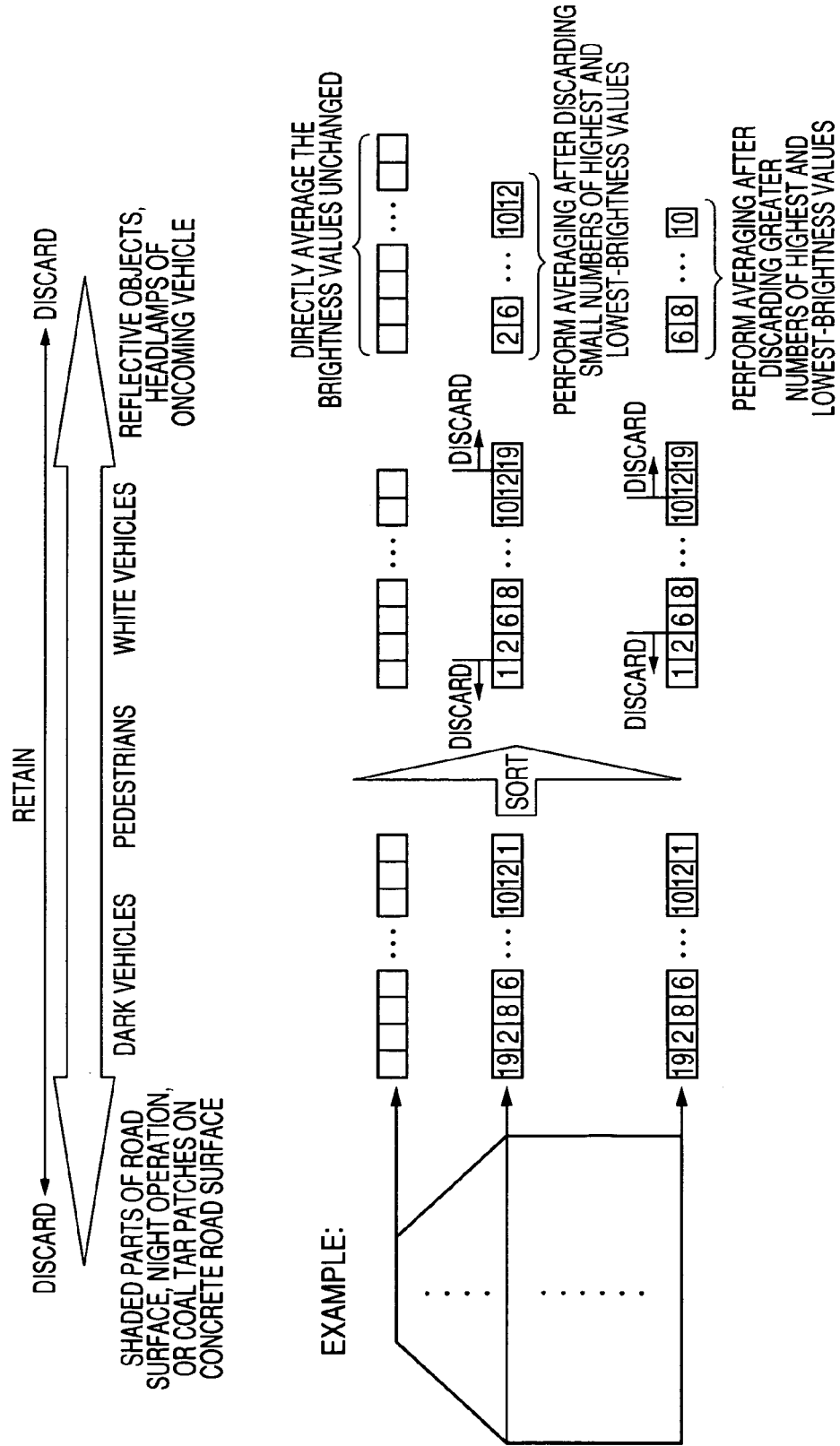
FIG. 9 illustrates exclusion of highest-brightness and lowest-brightness picture elements from each of respective lines of the brightness measurement region.

In addition, periodic thinning-out of picture elements within each line of the brightness measurement region is also performed, as indicated conceptually by the dotted-line portions in FIG. 8. With this embodiment, this periodic omission of respective picture elements (i.e., of luminance values corresponding to these picture elements) is performed at identical spacings within each picture line.

The luminance values of the picture elements of the brightness measurement region are the converted to respectively corresponding brightness values (i.e., indicative of brightness values in the external scene) by using the currently selected luminance control map and luminance control target value. Referring for example to diagram (b) of FIG. 2, assuming that a picture element value (luminance value) obtained from the camera 21 is K, then as indicated by the directions of the arrows, the corresponding converted brightness value is obtained as B by applying the currently selected luminance control map No. 7.

Next in step S132, for each picture line of the brightness measurement region, the picture elements are sorted in order of brightness value, then a fixed number of maximum-brightness picture elements and a fixed number of minimum-brightness picture elements of that line are excluded from further processing.

Assuming each of these fixed numbers is greater than one, the term "fixed number of maximum-brightness picture elements" as used in this description and in the appended claims signifies "the maximum-brightness picture element and one or more picture elements having successively lower brightness than the maximum-brightness value". Similarly, the term "fixed number of minimum-brightness picture elements" signifies the lowest-brightness picture element and one or more picture elements having converted brightness values that are successively higher than the minimum value.

Although with this embodiment, the above exclusion processing is performed based upon judging-converted brightness values of picture elements, it would also be possible to perform the exclusion processing based upon judging the luminance values, i.e., the picture element values as obtained from the camera 21.

Figure 10:
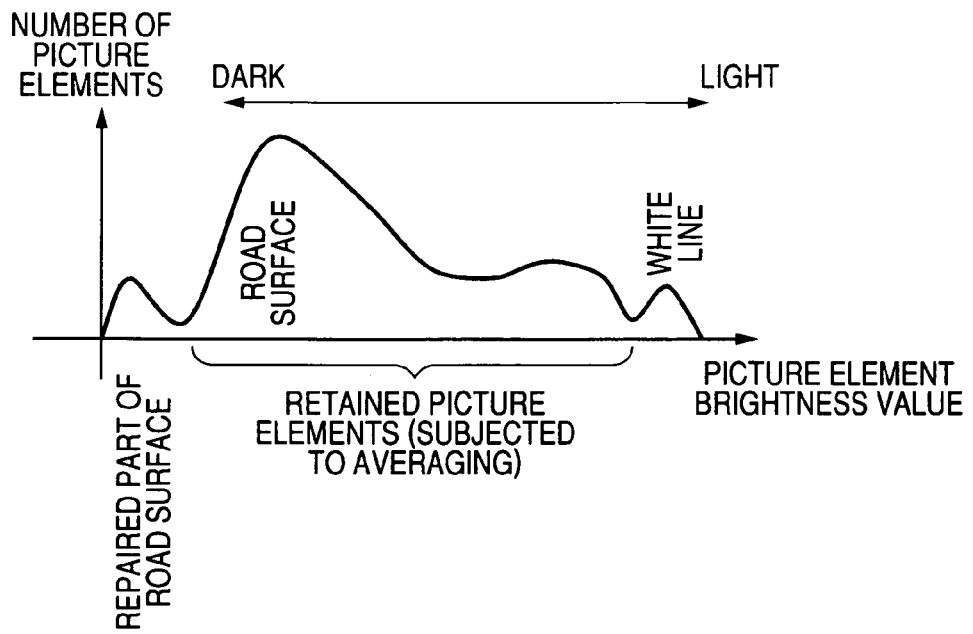
FIG. 10 is a diagram showing an example of distribution of brightness values in an image captured by a vehicle-mounted camera.

In the case of a road surface having a light coloration, such as a concrete surface, dark regions on the surface (such as portions repaired with coal tar, or joints in the roadway) are an obstruction to reliably measuring the brightness of the road surface. In the case of a dark road surface, e.g., formed of asphalt, white lines that are formed on the surface will similarly hinder reliable measurement of the brightness of the road surface. This is illustrated by the example of the distribution of brightness values of picture elements, for the case of a forward-view image of a road, shown in FIG. 10. With this embodiment, since highest and lowest brightness values of the brightness measurement region are excluded from further processing as described above, such problems due to excessively light or excessively dark regions on the road surface can be overcome.

In the case of a part of the road surface that is close to (directly ahead of) the local vehicle, it is possible to comparatively reliably distinguish excessively high or low brightness values resulting from white lines, coal tar patches, etc., on the road surface. However in the case of a part of the road surface that is distant from the local vehicle, it becomes difficult to distinguish such regions. For that reason, the farther the distance represented by the image position of a picture line (i.e., the higher the location of that line within the brightness measurement region) the smaller is made the number of picture element values that are excluded from the line by the exclusion processing described above. In the case of the picture lines corresponding to the most distant part of the brightness measurement region, no picture element values are excluded.

Figure 11:
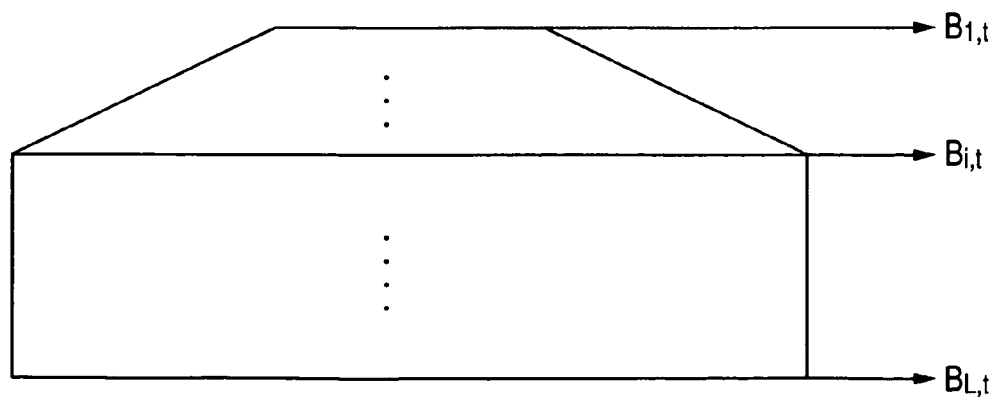
FIG. 11 illustrates the derivation of average brightness values of respective lines of picture elements in the brightness measurement region.

Next in step S133 as illustrated in FIG. 11, for each of the remaining picture lines of the brightness measurement region, the average of the converted brightness values of the picture elements of the line is calculated. The resultant respective average values are designated as $B_{i,t}$, where "i" denotes the position of the corresponding line within the brightness measurement region in a range from 1 to L, counting from the top of the brightness measurement region (as illustrated in FIG. 11), i.e., $1 \leq i \leq L$. The subscript portion "t" denotes the time-axis position of a picture element (spatial-domain) average value, e.g., expressed as a sequence number within a series of images successively captured at periodic time points up to the current time point.

By excluding the highest and lowest luminance values from this averaging processing it is ensured that, for each of the picture lines of the brightness measurement region, the (spatial) average brightness values of respective lines will vary in a more stable manner over time.

Next in step S134, for each of the L picture lines of the brightness measurement region, buffering is performed of the respective average luminance values that have been obtained for that picture line in a plurality of successively obtained images, using a buffer interval of (t~t–T). That is, for each of the picture lines, a set of (spatial-domain) average values which have been previously successively calculated and stored at respective time points are acquired (read out from memory) and set in buffer registers, to be subjected to averaging calculation. These buffered average values can be expressed as:

1st line: $B_{1,t} \ldots B_{1,t-T}$
i-th line: $B_{i,t} \ldots B_{i,t-T}$
L-th line: $B_{L,t} \ldots B_{L,t-T}$ If for example the buffering interval is 4, then for each of the picture lines in the range 1 to L, the corresponding respective average brightness values that have been stored in the memory section 12 for four successive images are acquired as the buffered average values for that picture line.

Next in step S135, time-axis filtering (i.e., smoothing by averaging processing) is applied to each of selected picture lines of the brightness measurement region (these picture lines being selected as described hereinafter). The time-axis filtering is performed by obtaining, for each of the selected picture lines, the average of the buffered values that have been acquired in step S134, i.e., assuming a continuous set of L lines;

1st line: $B_{1,t} \ldots B_{1,t-T} \rightarrow F_{1,t}$
i-th line: $B_{i,t} \ldots B_{i,t-T} \rightarrow F_{i,t}$
L-th line: $B_{L,t} \ldots B_{L,t-T} \rightarrow F_{L,t}$ It can be expected that there will be only a small degree of variation in the average brightness values of picture lines corresponding to a region that is close to (i.e., is immediately ahead of) the local vehicle, since the brightness of such a region will generally be determined by reflection of light from the road surface. Hence, little or no time-axis filtering is applied to picture lines of such a part of the brightness measurement region. However in the case of picture lines corresponding to a region that is distant from the local vehicle (i.e., is close to the FOE), there may be large amounts of time-axis variations in the successive average brightness values that are obtained for these picture lines. These variations can result from effects such as pitching of the local vehicle while light received from headlamps of opposing vehicles is affecting the brightness measurement region, thereby causing large changes in the successive average brightness values that are measured for these picture lines corresponding to a distant region.

For that reason, when time-axis filtering as described above is applied to a picture line corresponding to a region that is close to the FOE, a comparatively long buffer interval is used, for example corresponding to approximately 700 ms, i.e., averaging is performed using a large number of successively obtained values (large value of T).

This is made possible since with this embodiment, time axis filtering can be applied individually to respective picture lines of the brightness measurement region.

The above selective application of time-axis filtering to picture line average brightness values in accordance with distance from the local vehicle is illustrated in FIG. 12. As indicated, the greater the distance of an imaged region (that is, the higher the position of the corresponding picture lines within the captured image), the higher is made the effectiveness of the time-axis filtering against noise (dispersed fluctuations in brightness), that is to say, the greater is made the degree of smoothing that is applied against time-axis variations. Conversely, no time-axis filtering is applied to the average brightness values of picture lines in the part of the brightness measurement region that is closest to the local vehicle.

However it is also necessary that the apparatus be able to rapidly follow sudden changes in the scene brightness, in particular, the road surface brightness, which can occur when the local vehicle enters or leaves a tunnel, etc. Hence for each of the picture lines of the brightness measurement region, the time-axis filtering is selectively applied in accordance with the form of variations in the successive average brightness values obtained for that line. This is done in order to suppress fluctuations in the successive capture-objective brightness values while at the same time achieving a fast reaction to sudden changes in external scene brightness. This processing is applied to each of the picture lines of the brightness measurement region.

Specifically with this embodiment, if the successive average brightness values that are obtained for a picture line are found to be changing gradually over time as in the example of diagram (a) of FIG. 13, i.e., along a trend, without dispersion of values, then time-axis filtering is not applied. That is to say, the average value obtained for that picture line in the most recently captured image is used directly in calculating the image luminance value (that calculation described hereinafter).

If it is found that dispersed fluctuations are occurring in the average values obtained for a picture line, as illustrated in diagram (b) of FIG. 13, then time-axis filtering by weighted median filtering is applied to the successive average values. In all other cases, such as when the average values obtained for that picture line are successively varying as illustrated in diagram (c), time-axis filtering by non-weighted averaging is applied.

The term "weighted median filtering" as used herein signifies an averaging calculation in which greater weight is given to newer data than to older data.

The above processing performed in step S135 will be described more specifically in the following.

Assuming for example that T is 4, where the buffer interval is (t–0~t–T), the average brightness values of the i-th picture line within a buffer interval will be assumed to have the following magnitude relationships:

$$B_{i,t-1} < B_{i,t-3} < B_{i,t-2} < B_{i,t-4} < B_{i,t-0}$$

If either of the relationships of expression (1) below is satisfied, it is judged that dispersed fluctuations exceeding a predetermined amplitude are occurring in the successive average values obtained for the picture line, i.e., if the absolute difference between the newest value and the mid-point value exceeds the half-width (DZW/2) of the dead zone multiplied by the time separation (T/2) between these values. In that case, weighted median filtering is applied.

$$\frac{B_{i,t-0} - B_{i,t-2}}{DZW/2} > \frac{T}{2} \text{ or } \frac{B_{i,t-0} - B_{i,t-2}}{DZW/2} < -\frac{T}{2} \tag{1}$$

If either of the relationships of expression (2) below is satisfied, then it is judged that a gradual variation (a trend) is occurring in the successive average brightness values of that picture line, so that time-axis filtering is not applied, i.e., if the absolute difference between the newest value and the mid-point value exceeds the width (DZW) of the dead zone multiplied by the time separation (T/2) between these values. Similarly, time-axis filtering is not applied if either of the relationships of expression (3) below is satisfied, i.e., if the absolute difference between the newest value and the oldest value exceeds the width (DZW) of the dead zone multiplied by the time separation (T) between these values.

$$\frac{B_{i,t-0} - B_{i,t-2}}{DZW} > \frac{T}{2} \text{ or } \frac{B_{i,t-0} - B_{i,t-2}}{DZW} < -\frac{T}{2} \tag{2}$$

$$\frac{B_{i,t-4} - B_{i,t-0}}{DZW} > T \text{ or } \frac{B_{i,t-4} - B_{i,t-0}}{DZW} < -T \tag{3}$$

In all other cases, time-axis filtering by non-weighted averaging is applied.

Next in step S136, as shown by equation (4) below, weighted-averaging processing is applied to the set of average brightness values (of respective picture lines) obtained by the selectively applied time-axis filtering of step S135. The result of this weighted-averaging processing will be referred to as the preliminary capture-objective brightness value.

In equation (4), $F_{i,t}$ denotes the average brightness value of a picture line, and $W_i$ denotes a weighting value which is set for the picture line, for example as follows.

The preliminary capture-objective brightness value is obtained as a combination (with this embodiment, an average) of average values obtained for the picture lines of the target object-use region and for the picture lines of the road surface-use region. The brightness values within the road surface-use region (close to the local vehicle) are relatively stable, while those of the target object-use region are more variable. For that reason, when applying equation (4) to the picture line average brightness values of the road surface-use region, the respective weighting values W that are assigned in equation (4) are successively decreased in accordance with increasing closeness of the picture line (i.e., of the region represented by the picture line) to the local vehicle. Conversely, when applying equation (4) to the picture line average values of the target object-use region, the value of W is decreased in accordance with decreasing distance of the picture line (i.e., of the region represented by the picture line).

$$B_{IMG\_Temp,t} = \sum_{i=1}^{L} W_i \times F_{i,t} \tag{4}$$

Next (step S137), a plurality of capture-objective brightness values that have been successively obtained up to the current point are evaluated, to determine the extent of variation of these values. If the amplitude of the variations is within a predetermined limit, then the preliminary capture-objective brightness value is subsequently used in performing exposure control. If the extent of variation exceeds the limit, then low-pass filtering processing (described hereinafter) is applied and the result of this filtering is used in performing exposure control.

This low-pass filtering processing is performed to prevent brightness hunting.

Operation then proceeds to step S140 of FIG. 3.

Applying low-pass filtering to obtain the capture-objective brightness values can cause a lowering of response speed, so that this filtering is applied only when it is judged that these values are fluctuating excessively. The allowable limit of amplitude of variations of the successive capture-objective brightness values is determined based on the width of the dead zone, as described in the following.

Processing relating to the above low-pass filtering is performed in the following sequence of operations, in which P designates the number of precedingly obtained capture-objective brightness values that are used in evaluating the extent of variation of the capture-objective brightness values:

[1] Buffering (storing in data registers) of capture-objective brightness values that have been successively measured at periodic time points up to the current point (buffer interval: t~t−P):

$$B_{IMG\#Temp,t} \ldots B_{IMG\#Temp,t-P}$$

[2] Respective differences between each of these capture-objective brightness values and the immediately-precedingly derived capture-objective brightness value are calculated, as shown by equation (5) below (buffer interval: 0~P−1):

$$\text{Diff}_0 = B_{IMG\_Temp,t} - B_{IMG\_Temp,t-1} \ldots \text{Diff}_{P-1} = B_{IMG\_Temp,t-(P-1)} - B_{IMG\_Temp,t-P} \tag{5}$$

[3] The number of alternations in that series of capture-objective brightness values is then calculated, i.e., the number of changes in sign between adjacent difference values (that is, between each pair $\text{Diff}_i$ and $\text{Diff}_{i-1}$ within the set of difference values $\text{Diff}_0 \ldots \text{Diff}_{P-1}$)

Figure 15:
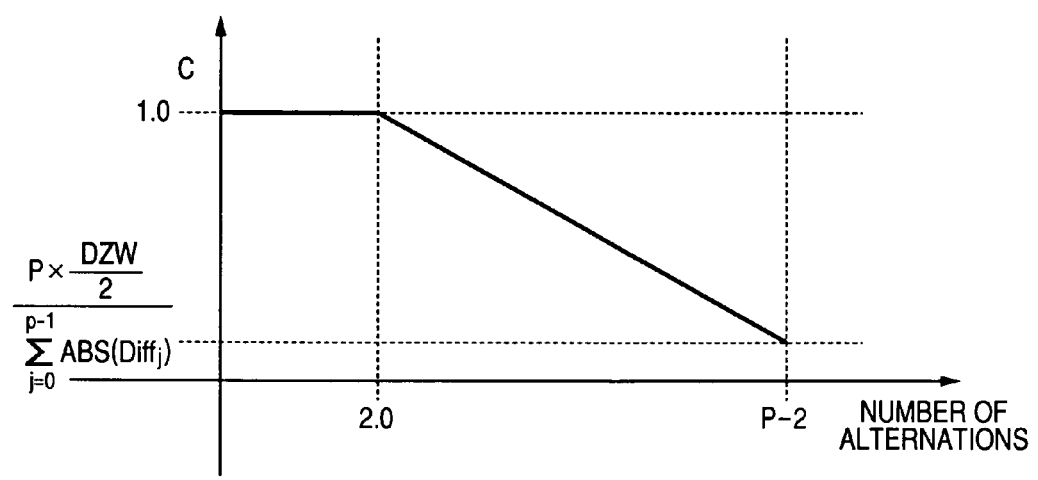
FIG. 15 is a graph which is used in evaluating the magnitude of fluctuations in successively obtained capture-objective brightness values in relations to a half-width value of the dead zone.

[4] The average absolute magnitude of the variations is evaluated in relation to the half-width DZW/2 of the dead zone. Specifically, if expression (6) below is satisfied, then it is judged that C=1.0 (where C is a parameter in equation (8) below). If expression (7) below is satisfied, then the value of C is obtained from the graph of FIG. 15.

$$\frac{\sum_{j=0}^{P-1} \text{ABS}(Diff_j)}{P} < \frac{DZW}{2} \tag{6}$$

$$\frac{\sum_{j=0}^{P-1} \text{ABS}(Diff_j)}{P} \geq \frac{DZW}{2} \tag{7}$$

[5] Low-pass filtering is then selectively applied, in accordance with equation (8) below, to obtain a capture-objective brightness value ($B_{IMG,t}$) for use in exposure control. That is to say, if the value of C is obtained as 1, then the preliminary capture-objective brightness value which was obtained in step S136 is subsequently used directly in exposure control. Otherwise (C<1), a low-pass filtering calculation is performed using at least one precedingly obtained capture-objective brightness value, and the result of this LPF processing is used in exposure control. With this embodiment, the low-pass filtering calculation consists of multiplying the preliminary capture-objective brightness value by C and the immediately precedingly obtained capture-objective brightness value by (1−C), and summing the results, i.e.:

$$B_{IMG,t} = C \times B_{IMG\_Temp,t} + (1-C) \times B_{IMG,t-1} \qquad (8)$$

This completes the processing of step S130 of FIG. 3. Next, in step S140 of FIG. 3, a decision is made as to whether the capture-objective brightness value obtained in step S130 is within the dead zone. If it is judged that the capture-objective brightness value is within the dead zone, the processing is ended. If the capture-objective brightness value is judged to be outside the dead zone range, step S150 is then executed in which a luminance control map is selected (as described hereinabove referring to diagram (b) of FIG. 2) in accordance with the capture-objective brightness value obtained in step S130 and the luminance control target value which was determined in step S110. Exposure control is then performed by setting the camera video amplifier gain and shutter speed in accordance with the selected luminance control map. Execution of the processing is then ended.

Figure 16:
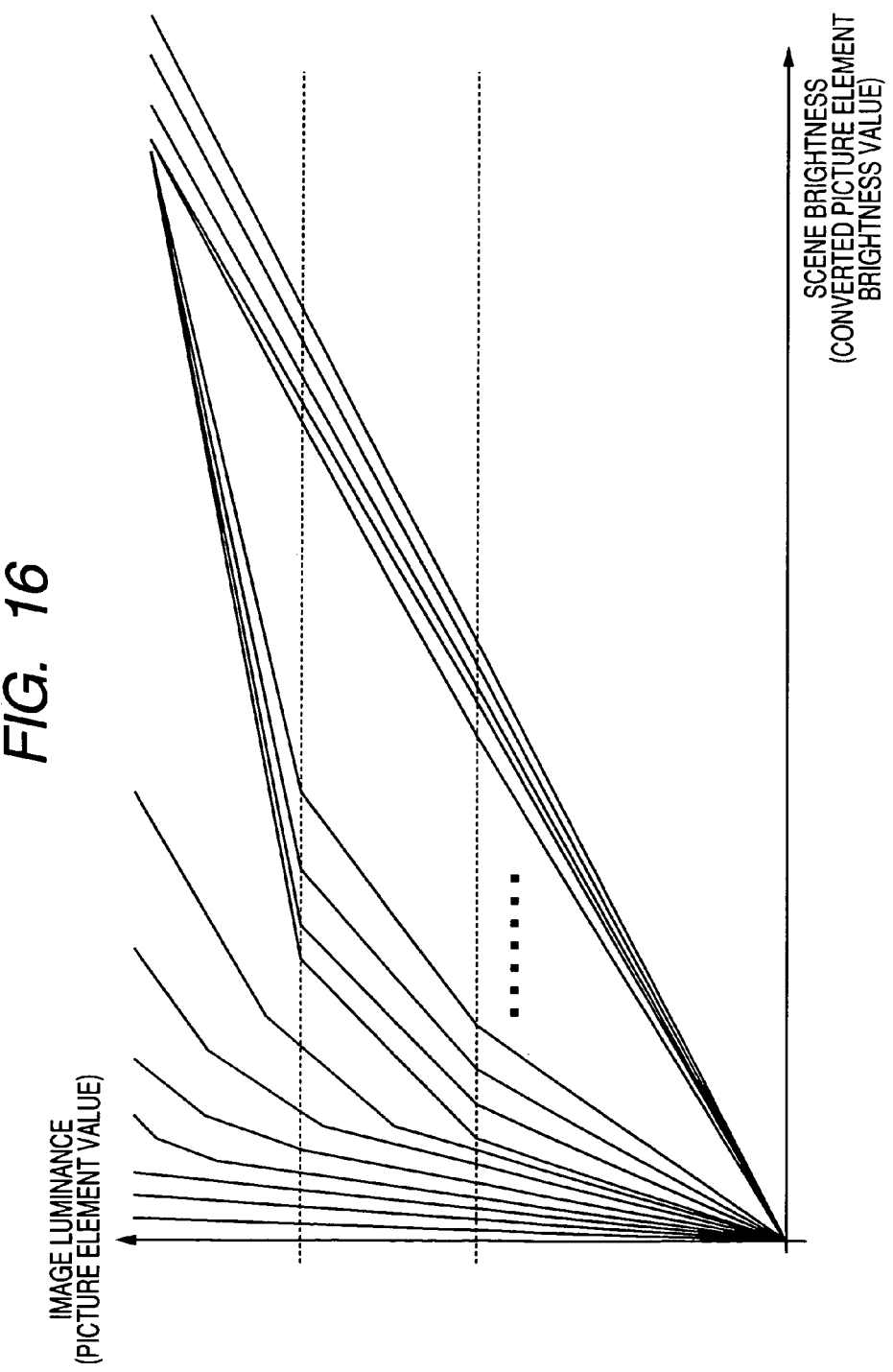
FIG. 16 shows an example of luminance control maps for enabling scene brightness measurement to be performed over a wide range of external scene brightness values.

The embodiment has been described above assuming that each of the luminance control maps have linear characteristics. However the camera 21 may be operated in a HDR (high dynamic range) mode, in which the range between minimum and maximum luminance values of the picture elements corresponds to a wider range of scene brightness values than in a normal mode. In that case, the luminance control maps may become of the form shown in FIG. 16, with bends formed in parts of the map characteristics. As a result of these non-linearities of the luminance control map characteristics, complex limitations may arise in the values of shutter speed and amplifier gain that can be utilized. For that reason it is desirable that the degree of change in the extent of bending, between adjacent luminance control maps, is made small.

By using such luminance control maps for HDR operation, when a sudden large change in external scene brightness occurs (for example when the local vehicle enters a tunnel) the time which elapses until appropriate control of the cameran exposure is achieved can be reduced.

Effects Obtained

As can be understood from the above, with the exposure control apparatus 10 of this embodiment, picture elements constituting a brightness measurement region are extracted from each of successive captured images (step S131), with the brightness measurement region being formed of a target object-use region and a road surface-use region. The brightness of a target object (e.g., preceding vehicle, which is located ahead of the local vehicle and is required to be detected through recognition processing applied to the captured images) is measured based on values obtained for the target object-use region, while the brightness of the road surface is measured based on values obtained for the road surface-use region. As a result, greater stability of exposure control (that is, control of the exposure of a camera which is required to obtain images expressing a target object) can be achieved than is possible with prior art types of apparatus which perform exposure control based only on detecting the brightness of a target object.

Furthermore, greater stability of exposure control is achieved under various conditions such as when the local vehicle enters or leaves a tunnel, or passes through areas of bright sunlight and shade, or when a preceding vehicle suddenly enters or exits from the field of view of the camera, etc. However these advantages of the invention are obtained without requiring a significant increase in processing load.

In addition with the present invention, stability of exposure control is enhanced by situating the uppermost part of the target object-use region at the FOE position of each image, thereby ensuring that extraneous light (e.g., from the sky) will not affect brightness measurement.

Figure 6:
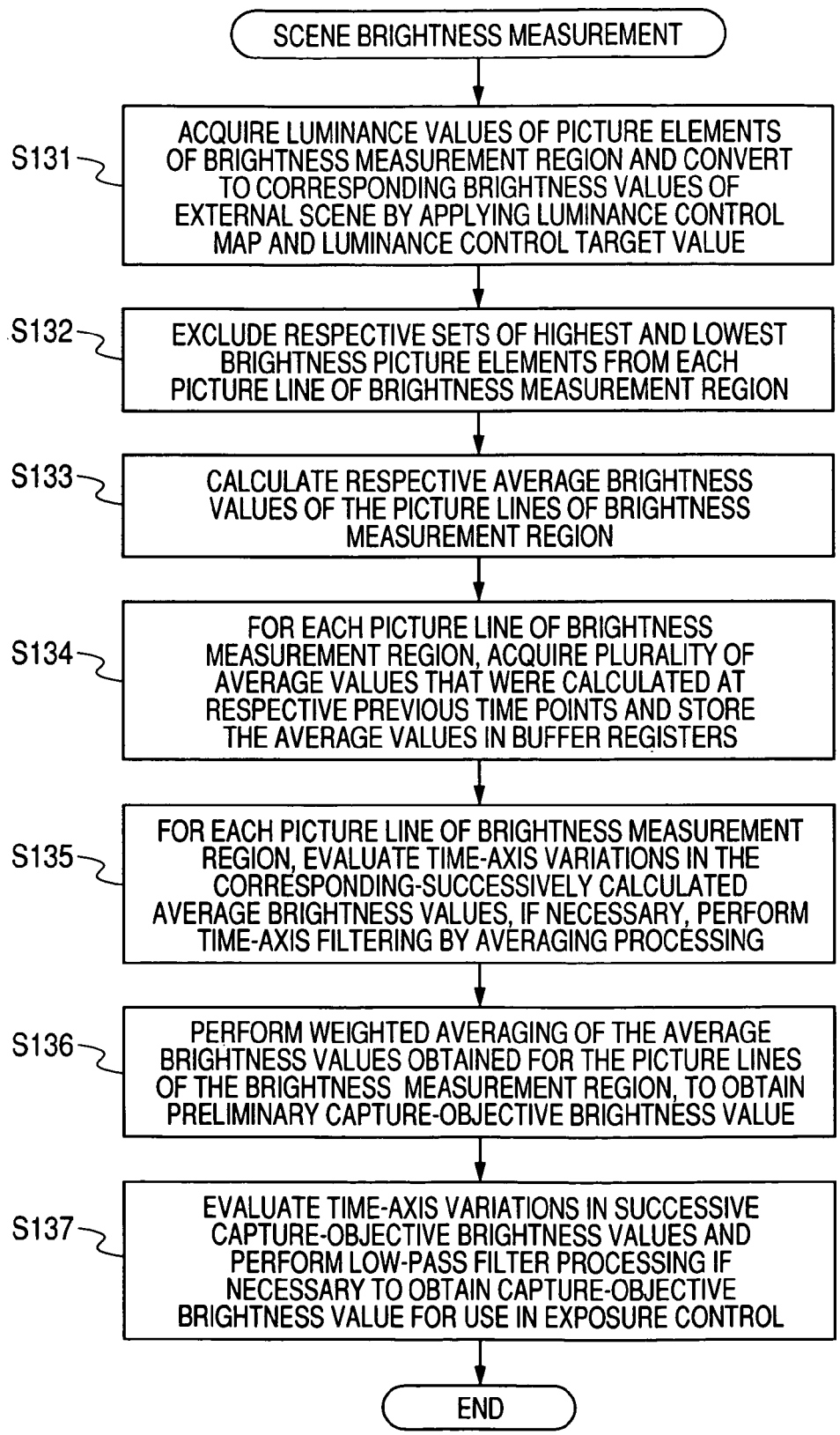
FIG. 6 is a flow diagram of processing for deriving a capture-objective brightness value, indicative of brightness in an external region ahead of a vehicle in which the embodiment is installed.

In the appended claims, extraction circuitry recited therein corresponds to the CPU 11 in executing the processing of step S131 of FIG. 6, while exposure control circuitry recited therein corresponds to the CPU 11 in executing the processing of step S150 of FIG. 3.

It should be noted that the invention is not limited to the embodiment described above, and that various modifications or alternative embodiments could be envisaged, which fall within the scope claimed for the invention. For example, the configuration of the brightness measurement region is not limited to that of the described embodiment, and can be formed as appropriate for a particular application.

What is claimed is:

1. An exposure control apparatus for exposure control of an electronic digital camera installed on a vehicle, said camera disposed to capture an external scene as an image comprising an array of picture elements having respective luminance values, said image expressing a target object located upon a surface of a road extending ahead of said vehicle, said exposure control apparatus comprising circuitry configured to convert said luminance values to corresponding brightness values of said external scene, based upon a predetermined relationship between an exposure condition of said camera, said luminance values, and said brightness values;

wherein said exposure control apparatus comprises extraction circuitry configured to extract from said image a first plurality of picture elements to constitute a target object-use region for use in measuring a brightness value of said target object and a second plurality of picture elements to constitute a road surface-use region for use in measuring a brightness value of said road surface, and exposure control circuitry configured to control said camera exposure, based upon said brightness values of said road surface-use region of said image and said brightness values of said target object-use region of said image;

and wherein said road surface-use region and said target object-use region are disposed at respective predetermined fixed locations within said image, said road surface-use region and said target object-use region are formed of respective fixed numbers of lines of picture elements, and respective numbers of picture elements constituting said lines of said target object-use region successively increase from an uppermost part of said target object-use region to a lowermost part of said target object-use region.

2. An exposure control apparatus according to claim 1, wherein said uppermost part of said target object-use region is located at a FOE (focus of expansion) position within said image.

3. An exposure control program stored in a memory of a computer, to be executed by said computer, for implementing respective functions of an exposure control apparatus for exposure control of an electronic digital camera installed on a vehicle, said camera disposed to capture an image of a scene ahead of said vehicle as respective luminance values of an array of picture elements, and said exposure control apparatus comprising means for converting said picture element luminance values to corresponding brightness values of said external scene, the functions of the exposure control apparatus comprising:

an extraction step for extracting from said image a first plurality of picture elements to constitute a target object-use region for use in measuring a brightness value of said target object, and a second plurality of picture elements to constitute a road surface-use region for use in measuring a brightness value of said road surface, and an exposure control step for controlling said exposure based upon said brightness values of said road surface-use region of said image and said brightness values of said target object-use region of said image, in combination;

and wherein said road surface-use region and said target object-use region are disposed at respective predetermined fixed locations within said image, each of said road surface-use region and said target object-use region is formed of a fixed number of lines of picture elements, and respective numbers of picture elements constituting said lines of said target object-use region successively increase from an uppermost part of said target object-use region to a lowermost part of said target object-use region.

* * * * *